United States Patent
Turcinskas et al.

(10) Patent No.: US 10,597,326 B2
(45) Date of Patent: *Mar. 24, 2020

(54) GEOPOLYMER FOAM FORMULATION FOR A NON-FLAMMABLE, SOUND-ABSORBING, THERMALLY INSULATING GEOPOLYMER FOAM ELEMENT

(71) Applicant: Construction Research & Technology, GmbH, Trostberg (DE)

(72) Inventors: Sarunas Turcinskas, Trostberg (DE); Sven Mönnig, Remseck (DE); Maxim Pulkin, Rosenheim (DE); Gregor Herth, Trostberg (DE); Shengzhong Zhou, Shanghai (CN)

(73) Assignee: Construction Research & Technology, GmbH, Trostberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/235,006

(22) Filed: Dec. 28, 2018

(65) Prior Publication Data

US 2019/0152853 A1 May 23, 2019

Related U.S. Application Data (63) Continuation of application No. 15/030,490, filed as application No. PCT/EP2014/072027 on Oct. 14, 2014, now Pat. No. 10,214,452.

(30) Foreign Application Priority Data

Oct. 31, 2013 (EP) .................................. 13190998

(51) Int. Cl.
| | |
|---|---|
| *C04B 28/00* | (2006.01) |
| *C04B 103/40* | (2006.01) |
| *C04B 111/28* | (2006.01) |
| *C04B 111/52* | (2006.01) |
| *C04B 111/34* | (2006.01) |

(52) U.S. Cl.
CPC ........ *C04B 28/006* (2013.01); *C04B 2103/40* (2013.01); *C04B 2103/408* (2013.01); *C04B 2111/28* (2013.01); *C04B 2111/34* (2013.01); *C04B 2111/52* (2013.01); *C04B 2201/20* (2013.01); *C04B 2201/50* (2013.01); *Y02P 40/165* (2015.11); *Y02W 30/92* (2015.05); *Y02W 30/94* (2015.05)

(58) Field of Classification Search
CPC . Y02P 40/165; C04B 2201/20; C04B 28/006; C04B 2103/408; C04B 2103/40; C04B 2111/28; C04B 2111/34; C04B 2111/52
See application file for complete search history.

(56) References Cited

U.S. PATENT DOCUMENTS

| | | |
|---|---|---|
| 3,396,112 A | 8/1968 | Burrows |
| 4,349,386 A | 9/1982 | Davidovits |
| 4,472,199 A | 9/1984 | Davidovits |
| 5,194,091 A | 3/1993 | Laney |
| 5,244,726 A | 9/1993 | Laney et al. |
| 7,238,760 B2 | 7/2007 | Schinabeck et al. |
| 7,772,300 B2 | 8/2010 | Schinabeck et al. |
| 8,202,362 B2 | 6/2012 | Davidovits et al. |
| 8,349,960 B2 | 1/2013 | Gaeberlein et al. |
| 8,846,784 B2 | 9/2014 | Gaeberlein et al. |
| 2009/0229493 A1 | 9/2009 | Kim et al. |
| 2010/0043674 A1 | 2/2010 | Gaillard et al. |
| 2010/0272983 A1 | 10/2010 | Thouilleux et al. |
| 2012/0247369 A1 | 10/2012 | Ellenrieder et al. |
| 2014/0047999 A1 | 2/2014 | Razl |
| 2014/0371351 A1 | 12/2014 | Dantin et al. |
| 2015/0080500 A1 | 3/2015 | Dierschke et al. |
| 2017/0165154 A1 | 6/2017 | Ashida et al. |

FOREIGN PATENT DOCUMENTS

| | | |
|---|---|---|
| CN | 1097198 A | 1/1995 |
| CN | 102617106 A | 8/2012 |
| DE | 4301749 A1 | 7/1994 |
| DE | 10200406563 A1 | 9/2005 |
| DE | 202009001754 U1 | 8/2010 |
| EP | 2559532 A2 | 2/2013 |
| WO | WO 85/03699 A1 | 8/1985 |
| WO | WO 92/10440 A1 | 6/1992 |
| WO | WO 02/10229 A1 | 2/2002 |
| WO | WO 2005/090424 A1 | 9/2005 |
| WO | WO 2007/017286 A1 | 2/2007 |
| WO | WO 2008/012438 A2 | 1/2008 |
| WO | WO 2008/026006 A1 | 3/2008 |
| WO | WO 2008/151878 A1 | 12/2008 |
| WO | WO 2011/106815 A1 | 9/2011 |
| WO | WO 2012/069024 A2 | 5/2012 |
| WO | WO 2013/131583 A1 | 9/2013 |
| WO | WO 2013/148843 A2 | 10/2013 |
| WO | WO 2013/152963 A1 | 10/2013 |
| WO | WO 2013/158852 A1 | 10/2013 |
| WO | WO-2015062819 A1 * | 5/2015 ........... C04B 28/006 |

OTHER PUBLICATIONS

International Search Report, PCT/EP2014/072027, dated Feb. 19, 2015.

(Continued)

*Primary Examiner* — Christopher M Rodd
(74) *Attorney, Agent, or Firm* — Curatolo Sidoti Co., LPA; Salvatore A. Sidoti (57) ABSTRACT

A geopolymer foam formulation, comprising at least one inorganic binder comprising metakaolin; at least one alkaline activator selected from the group consisting of alkali metal hydroxides, alkali metal carbonates, alkali metal aluminates, alkali metal silicates and mixtures thereof; at least one alkyl-polyglucoside surfactant; a gas phase and water. This formulation can also comprise a cement, and also additives for foam stabilization, shrinkage reduction, flexibilization, hydrophobization, or dispersion, fibres and fillers or a mixture thereof, and can be a single-component or two-component formulation. An incombustible, sound-absorbing, thermally insulating geopolymer foam element.

20 Claims, 2 Drawing Sheets

(56) References Cited

OTHER PUBLICATIONS

International Written Opinion, PCT/EP2014/072027, dated Feb. 19, 2015.
Chinese Office Action, CN201480060257.4, dated Jul. 26, 2017.

* cited by examiner

GEOPOLYMER FOAM FORMULATION FOR A NON-FLAMMABLE, SOUND-ABSORBING, THERMALLY INSULATING GEOPOLYMER FOAM ELEMENT

CROSS-REFERENCE TO RELATED APPLICATIONS

The present application is a continuation of co-pending U.S. Ser. No. 15/030,490, filed Apr. 19, 2016, which is a national stage application of International Application No. PCT/EP2014/072027, filed 14 Oct. 2014, which claims the benefit of European Application No. 13190998.8, filed 31 Oct. 2013, from which applications priority is claimed, and which are incorporated by reference herein.

The present invention relates to a geopolymer foam formulation, a process for the production of said geopolymer foam formulation, the use of said formulation for the production of an incombustible, sound-absorbing, thermally insulating geopolymer foam element and the said geopolymer foam element itself.

Room acoustics depend greatly on architectural parameters. The variables that determine room acoustics can be influenced to a greater or lesser extent via appropriate room design. An important objective in room acoustics, alongside simple noise reduction, is to adapt the acoustic properties of a room to its intended purpose. Acoustic fields in rooms are diffuse, unlike those in the external world, because they are generated by direct and reflected sound. They can be controlled via appropriate acoustic power reduction. Technical sound absorbers are used here which permit targeted absorption and reflection.

In principle, it is possible to divide technical absorbers into two groups based on their mode of operation, namely into resonators and porous absorbers. The mode of operation of resonators very generally involves acoustic spring-mass systems which have a pronounced sound absorption maximum. Examples of these sound absorbers are sheet resonators, Helmholtz resonators and microperforated absorbers.

In contrast to this, porous absorbers primarily absorb acoustic energy via friction at the pore walls, where it is converted into thermal energy. This requires an open-pore structure with adequate porosity. Because sound absorption is achieved primarily via dissipation, the sound absorption spectrum of porous sound absorbers is significantly different from that of resonators. In the ideal case here, the frequency-dependent sound absorption coefficient rises constantly towards higher frequencies in the shape of an s and asymptotically approaches a maximum. Porous absorbers can have various structures. Many different materials can be used here.

Foam products are generally two-phase systems where one phase is gaseous and the other is solid or liquid. The gaseous phase here consists of fine gas bubbles delimited by solid or liquid cell walls. The cell walls meet one another at nodes and thus form a framework.

Foams with sound-absorbing properties are mostly open-cell foams. The thin partitions between the delimiting walls here are disrupted at least to some extent, and there is at least some connection between the cells. The material thus acts as porous absorber. Very many different materials are used for the cell walls in open-cell foams. They range from metals by way of inorganic materials as far as organopolymers, which nowadays make up by far the greatest proportion in industrial use, the term foams being generally applied to these. Organopolymer foams are divided, on the basis of their rigidity, into flexible and rigid foams. Formation of bubbles in these is mostly achieved by way of a blowing gas which is produced in situ via a chemical reaction, or by way of a chemical compound which is dissolved in the organic matrix and which, at low temperatures, boils or decomposes to give gaseous products. Foams can also be produced via mechanical mixing to incorporate gases, via polymerization in solution with phase separation, or via use of fillers which are dissolved out from the material after the curing process.

In the literature there are many descriptions of open-call PUR foams. They are usually produced from isocyanate-containing compounds and polyols. Foaming predominantly uses blowing gases which have physical action by virtue of their low boiling point. There are also specific well-known blowing gas combinations of blowing gases having physical action and carbon dioxide produced via chemical reaction of the isocyanate groups with water during the foaming process. During reaction of water with isocyanates, unlike in the reaction of polyols, urea groups are produced alongside carbon dioxide, and contribute to the formation of the cell structure. Melamine foams provide another alternative.

A decisive disadvantage of organopolymer foams is that they are combustible, or, to use a different expression, have restricted thermal stability. Even organopolymer foams classified as having "low flammability" can, on combustion, liberate toxic gases and produce flaming drops. They can also, if they have been produced in particular ways and have particular compositions, liberate fumes that are hazardous in indoor areas, an example being formaldehyde. There was therefore a requirement for incombustible inorganic foams.

DE 102004006563 A1 describes a process for the production of an inorganic-organic hybrid foam by the following steps: a) mixing of at least one inorganic reactive component that forms a stone-like material, at least one aqueous hardener which, under alkaline conditions, brings about a curing reaction of the at least one inorganic reactive component, at least one foaming agent, at least one organic silicon compound and at least one surfactant, and b) at least partial hardening of the mixture. However, no purely inorganic foam is formed here.

DE 4301749 A1 describes an acoustic damper for the passage of exhaust gases from internal combustion engines with at least one sound-absorbing body made of a porous material. In order to achieve the best possible acoustic damping together with simple production, it is proposed that the material is based on a geopolymer. However, the composition of the geopolymer here is not explained in any greater detail.

WO 2011/106815 A1 describes a formulation for the production of a fire-protection mineral foam comprising or consisting of a waterglass, at least one aluminium silicate, at least one hydroxide and at least one oxidic component from a group comprising $SiO_2$ and $Al_2O_3$, characterized in that the waterglass is present in a proportion selected from a range of 10 parts by weight and 50 parts by weight, the aluminium silicate is present in a proportion such that the proportion of $Al_2O_3$ is from 8 parts by weight to 55 parts by weight, the hydroxide is present in a proportion such that the proportion of OH is from 0.5 part by weight to 4 parts by weight and the oxidic component is present in a proportion of from 5 parts by weight to 55 parts by weight; it also describes the mineral foam and a process for the production of the mineral foam.

That document proposes as preferred aluminium silicate an aluminium silicate activatable under alkaline conditions, in particular a volcanic aluminium silicate, preferably basalt, pitchstone, obsidian, phonolite, and/or metakaolin; $SiO_2$ and, respectively, $Al_2O_3$ is proposed as preferred oxidic component. Although WO 2011/106815 A1 provides no inventive examples, it was found that use of these components could achieve only inadequate early and final strength values for the hardened geopolymer foam formulation. There was therefore a requirement for incombustible inorganic foams with adequate early and final strength.

The object of the present invention therefore consisted in eliminating, at least to some extent, the prior-art disadvantages described in the introduction. In particular the intention was to provide an incombustible inorganic foam. This should be amenable to use as porous sound absorber. It should moreover have adequate early and final strength, so as to ensure good practical handling properties.

Said object has been achieved with the features of the independent claims. The dependent claims provide preferred embodiments.

Irrespective of the fact that the object stated has been achieved in its entirety, the geopolymer foam formulation of the invention has the advantage that it can be produced easily and at low cost and, in hardened form, has good thermal insulation properties.

The present invention firstly provides a geopolymer foam formulation comprising at least one inorganic binder selected from the group consisting of latently hydraulic binders, pozzolanic binders and mixtures thereof; at least one alkaline activator selected from the group consisting of alkali metal hydroxides, alkali metal carbonates, alkali metal aluminates, alkali metal silicates and mixtures thereof; at least one surfactant selected from the group consisting of anionic surfactants, cationic surfactants, non-ionic surfactants and mixtures thereof; a gas phase and water.

For the purposes of the present invention, the expression "geopolymer foam formulation" is intended to mean that this formulation comprises all of the components required in order to provide a geopolymer foam, i.e. an inorganic binder, an alkaline activator, a surfactant, water, and a gas phase. These components can take the form of premix, or else can be in separate form as what is known as a "kit of parts". As stated at a later stage below, the water and the alkaline activator can be provided separately from the other components, or the alkaline activator can be in dry form together with the other components, so that it is only then necessary to add water and to carry out foaming. It is, of course, also possible that the geopolymer foam formulation is in ready-foamed form.

According to the invention, the "gas phase" can be the gas present in powder components. This quantity of gas is often not in itself sufficient. It is therefore also possible that gas provided in a suitable form is involved here, for example in the form of gas bottles, compressed gas, compressed air, etc. For the purposes of the present invention, the expression gas phase is also intended to cover hydrogen gas liberated by way of a reaction with the alkaline aqueous medium deriving from metals such as Mg, Al, Zn, oxygen gas produced in the alkaline medium from $H_2O_2$ or peroxides, nitrogen gas produced from labile nitrogen-containing compounds, and also gas in the form of (optionally soluble or reactive) hollow microbeads. The expression "gas phase" can therefore also be understood as synonymous with "a component comprising or liberating gas phase". If the geopolymer foam formulation is already in foamed form, the expression "gas phase" means, of course, as stated at an earlier stage above, that gas bubbles are present in the foam matrix. The regions occupied by the gas bubbles in the hardened "geopolymer foam elements" are also sometimes termed air pores.

For the purposes of the present invention, the term "comprising" is intended to include the narrower term "consisting of", but not to be synonymous therewith. It is moreover intended that in each actual case the sum of all of the percentages of the specified and unspecified constituents of the formulation of the invention is always 100%.

It is well known that inorganic binder systems can be based on reactive water-insoluble compounds based on $SiO_2$ in conjunction with $Al_2O_3$ which harden in an aqueous alkaline environment. Binder systems of this type are termed inter alia "geopolynners", and are described by way of example in U.S. Pat. No. 4,349,386, WO 85/03699 and U.S. Pat. No. 4,472,199. Materials that can be used as reactive oxide or reactive oxide mixture here are inter alia microsilica, metakaolin, aluminosilicates, flyash, activated clay, pozzolans or a mixture thereof. The alkaline environment used to activate the binders usually consists of aqueous solutions of alkali metal carbonates, alkali metal fluorides, alkali metal hydroxides, alkali metal aluminates and/or alkali metal silicates, e.g. soluble waterglass. Geopolymers can be less costly and more robust than Portland cement and can have a more advantageous $CO_2$ emission balance. In relation to the term "foam" reference is made to the introduction to the description.

Pure geopolymers generally have low calcium content, because they use the abovementioned oxides. Our U.S. Pat. No. 8,460,459 B2 describes an inorganic binder system which comprises from 12 to 25% by weight of CaO, and which permits production of construction chemistry products that are resistant to chemical attack. (However, that document does not indicate any geopolymer foam formulation and does not provide a geopolymer foam element or give any consideration thereto).

For the purposes of the present invention, a "latently hydraulic binder" is preferably a binder in which the molar ratio (CaO+MgO):$SiO_2$ is from 0.8 to 2.5 and particularly from 1.0 to 2.0. In general terms, the abovementioned latently hydraulic binders can be selected from industrial and/or synthetic slag, in particular from blast furnace slag, electrothermal phosphorous slag, steel slag and mixtures thereof, and the "pozzolanic binders" can generally be selected from amorphous silica, preferably precipitated silica, fumed silica and microsilica, ground glass, metakaolin, aluminosilicates, flyash, preferably brown-coal flyash and hard-coal flyash, natural pozzolans such as tuff, trass and volcanic ash, natural and synthetic zeolites and mixtures thereof.

The slag can be either industrial slag, i.e. waste products from industrial processes, or else synthetic slag. The latter can be advantageous because industrial slag is not always available in consistent quantity and quality.

Blast furnace slag (BFS) is a waste product of the glass furnace process. Other materials are granulated blast furnace slag (GBFS) and ground granulated blast furnace slag (GG-BFS), which is granulated blast furnace slag that has been finely pulverized. Ground granulated blast furnace slag varies in terms of grinding fineness and grain size distribution, which depend on origin and treatment method, and grinding fineness influences reactivity here. The Blaine value is used as parameter for grinding fineness, and typically has an order of magnitude of from 200 to 1000 $m^2$ $kg^{-1}$, preferably from 300 to 500 $m^2$ $kg^{-1}$. Finer milling gives higher reactivity.

For the purposes of the present invention, the expression "blast furnace slag" is however intended to comprise materials resulting from all of the levels of treatment, milling, and quality mentioned (i.e. BFS, GBFS and GGBFS). Blast furnace slag generally comprises from 30 to 45% by weight of CaO, about 4 to 17% by weight of MgO, about 30 to 45% by weight of $SiO_2$ and about 5 to 15% by weight of $Al_2O_3$, typically about 40% by weight of CaO, about 10% by weight of MgO, about 35% by weight of $SiO_2$ and about 12% by weight of $Al_2O_3$.

Electrothermal phosphorous slag is a waste product of electrothermal phosphorous production. It is less reactive than blast furnace slag and comprises about 45 to 50% by weight of CaO, about 0.5 to 3% by weight of MgO, about 38 to 43% by weight of $SiO_2$, about 2 to 5% by weight of $Al_2O_3$ and about 0.2 to 3% by weight of $Fe_2O_3$, and also fluoride and phosphate. Steel slag is a waste product of various steel production processes with greatly varying composition.

Amorphous silica is preferably an X-ray-amorphous silica, i.e. a silica for which the powder diffraction method reveals no crystallinity. The content of $SiO_2$ in the amorphous silica of the invention is advantageously at least 80% by weight, preferably at least 90% by weight. Precipitated silica is obtained on an industrial scale by way of precipitating processes starting from waterglass. Precipitated silica from some production processes is also called silica gel.

Fumed silica is produced via reaction of chlorosilanes, for example silicon tetrachloride, in a hydrogen/oxygen flame. Fumed silica is an amorphous $SiO_2$ powder of particle diameter from 5 to 50 nm with specific surface area of from 50 to 600 $m^2$ $g^{-1}$.

Microsilica is a by-product inter alia of silicon production or ferrosilicon production, and likewise consists mostly of amorphous $SiO_2$ powder. The particles have diameters of the order of magnitude of 0.1 μm. Specific surface area is of the order of magnitude of from 15 to 30 $m^2$ $g^{-1}$.

In contrast to this, commercially available quartz sand is crystalline and has comparatively large particles and comparatively small specific surface area. It serves as inert filler in the invention.

Flyash is produced inter alia during the combustion of coal in power stations. Class C flyash (brown-coal flyash) comprises according to WO 08/012438 about 10% by weight of CaO, whereas class F flyash (hard-coal flyash) comprises less than 8% by weight, preferably less than 4% by weight, and typically about 2% by weight of CaO.

Metakaolin is produced when kaolin is dehydrated. Whereas at from 100 to 200° C. kaolin releases physically bound water, at from 500 to 800° C. a dehydroxylation takes place, with collapse of the lattice structure and formation of metakaolin ($Al_2Si_2O_7$). Accordingly pure metakaolin comprises about 54% by weight of $SiO_2$ and about 46% by weight of $Al_2O_3$.

For the purposes of the present invention, aluminosilicates are the abovementioned reactive compounds based on $SiO_2$ in conjunction with $Al_2O_3$ which harden in an aqueous alkali environment. It is of course not essential here that silicon and aluminium are present in oxidic form, as is the case by way of example in $Al_2Si_2O_7$. However, for the purposes of quantitative chemical analysis of aluminosilicates it is usual to state the proportions of silicon and aluminium in oxidic form (i.e. as "$SiO_2$" and "$Al_2O_3$").

An overview of suitable raw materials for geopolymers is found by way of example in Caijun Shi, Pavel V. Krivenko, Della Roy, Alkali-Activated Cements and Concretes, Taylor & Francis, London & New York, 2006, pp. 6-63.

Particularly suitable materials for the geopolymer foam formulation of the invention have however proved to be inorganic binders from the group consisting of blast furnace slag, microsilica, metakaolin, aluminosilicates, flyash and mixtures thereof. Whereas metakaolin brings about particularly good foaming results, where processability, spreadability, and the foaming process are rendered more advantageous in that less time is required to achieve the same volume than in the case of formulations using granulated blast furnace slag and microsilica, blast furnace slag is advantageous, in particular in combination with microsilica, in providing high early and final strength values of the geopolymer foam elements obtainable.

The basis of one preferred embodiment of the formulation of the invention is therefore that the inorganic binder comprises metakaolin. The basis for another preferred embodiment of the formulation of the invention is that the inorganic binder comprises blast furnace slag.

The basis of one particularly preferred embodiment of the formulation of the invention is that the inorganic binder comprises blast furnace slag and additionally metakaolin and/or microsilica. In other words, the latently hydraulic binder is blast furnace slag (in any of the various levels of treatment, milling, and quality), and the pozzolanic binder is selected from microsilica, metakaolin, and mixtures thereof. It is very particularly preferable that the inorganic binder consists of blast furnace slag and additionally microsilica and/or metakaolin.

It is preferable to use an alkaline activator selected from alkali metal hydroxides of the formula MOH and alkali metal silicates of the formula m $SiO_2$.n $M_2O$, where M is the alkali metal, preferably Li, Na or K or a mixture thereof, and the molar ratio m:n is ≤4.0, preferably ≤3.0, with further preference ≤2.0, in particular ≤1.70, and with very particular preference ≤1.20.

The alkali metal silicate is preferably waterglass, particularly preferably an aqueous waterglass and in particular a sodium waterglass or potassium waterglass. However, it is also possible to use lithium waterglass or ammonium waterglass or a mixture of the waterglasses mentioned.

The m:n ratio stated above (also termed "modulus") should preferably not be exceeded, since otherwise reaction of the components is likely to be incomplete. It is also possible to use very much smaller moduli, for example about 0.2. Waterglasses with higher moduli should be adjusted before use to moduli in the range of the invention by using a suitable aqueous alkali metal hydroxide.

Potassium waterglasses in the advantageous modulus range are mainly marketed as aqueous solutions because they are very hygroscopic; sodium waterglasses in the advantageous modulus range are also obtainable commercially as solids. The solids contents of the aqueous waterglass solutions are generally from 20% by weight to 60% by weight, preferably from 30 to 50% by weight.

Waterglasses can be produced industrially via melting of quartz sand with the appropriate alkali metal carbonates. However, they can also be obtained without difficulty from mixtures of reactive silicas with the appropriate aqueous alkali metal hydroxides. It is therefore possible in the invention to replace at least some of the alkali metal silicate with a mixture of a reactive silica and of the appropriate alkali metal hydroxide.

In one preferred embodiment of the present invention, the alkaline activator therefore comprises a mixture of alkali metal hydroxides and of alkali metal silicates.

The preferred quantity present of the alkaline activator in the invention, based on the geopolymer foam formulation of the invention, is from 1 to 55% by weight and in particular from 20 to 50% by weight, where these data relate to solids contents.

The surfactant mentioned in the introduction is an essential constituent of the geopolymer foam formulation of the invention. Only the simultaneous presence of surfactant and water permits stabilization, in this geopolymer foam formulation, of a gas phase in the form of gas bubbles which are responsible for the preferably open-cell pore structure in the hardened geopolymer foam and, respectively, in the geopolymer foam element described at a later stage below.

Not all surfactants are equally effective in the highly alkaline geopolymer foam formulation often comprising waterglass and in principle latently hydraulic, and also pozzolanic, binders. It has been found that non-ionic surfactants, preferably alkyl polyglucosides, have the best suitability for stabilizing the gas phase and therefore the foam.

Alkyl polyglucosides generally have the formula $H-(C_6H_{10}O_5)_m-O-R^1$, where $(C_6H_{10}O_5)$ is a glucose unit and $R^1$ is a $C_{6-22}$-alkyl group, preferably a $C_{8-16}$-alkyl group and in particular a $C_{8-12}$-alkyl group, and m=from 1 to 5.

Some of the surfactant, preferably less than 30% by weight, can be replaced with saponified balsamic and tall resins. By way of example it is possible here to use Vinapor® MTZ/K50 from BASF SE, which is a pulverulent, spray-dried modified and saponified balsamic and tall resin which is usually used to form air-filled pores.

The proportion of the surfactant, based on the geopolymer foam formulation of the invention, can advantageously be from 0.1 to 2.5% by weight and in particular from 0.5 to 1.5% by weight.

The abovementioned gas phase is advantageously selected from the group consisting of air, nitrogen, noble gas, hydrocarbons and mixtures thereof. It can be introduced into the formulation via chemical processes (for example decomposition of $H_2O_2$ or of other peroxides or of nitrogen-containing compounds) or via mechanical foaming, as described at a later stage below.

In one preferred embodiment of the present invention, the gas phase makes up from 20 to 90 percent by volume, in particular from 50 to 80 percent by volume, of the geopolymer foam formulation.

The formulation of the invention is moreover characterized in that it advantageously comprises from 10 to 60% by weight, preferably from 25 to 50% by weight, of water.

Expressed in other terms, the ratio by weight of water to binder (w/b value), where the solids content of the alkaline activator must be counted with the binder and the water content of the alkaline activator must be counted with the water, is from 0.11 to 1.5, in particular from 0.33 to 1.0.

The entire geopolymer foam formulation of the invention can comprise
from 3 to 60% by weight, preferably from 5 to 50% by weight, of blast furnace slag,
from 3 to 70% by weight, preferably from 5 to 50% by weight, of microsilica and/or metakaolin,
from 0 to 50% by weight of flyash,
from 1 to 55% by weight of alkaline activator (calculated as solids content),
from 10 to 60% by weight of water (entire quantity),
and also surfactant, gas phase and optionally other additives.

The expression "entire quantity" takes into account the fact that the alkaline activator can likewise comprise water. However, this is counted with the 10-60% of water.

The geopolymer foam formulation of the invention can preferably comprise
from 20 to 75% by weight of inorganic binder,
from 3 to 50% by weight of alkaline activator (calculated as solids content),
from 10 to 50% by weight of water (entire quantity),
and also surfactant, gas phase and optionally other additives.

In one particularly preferred embodiment the geopolymer foam formulation of the invention can comprise
from 20 to 50% by weight of inorganic binder,
from 5 to 25% by weight of alkaline activator (calculated as solids content),
from 10 to 40% by weight of water (entire quantity),
and also surfactant, gas phase and optionally other additives.

A ratio of silicon atoms to aluminium atoms that has proved advantageous in the geopolymer foam formulation of the invention is from 10:1 to 1:1, and a preferred ratio here is from 6:1 to 1.5:1 and in particular from 1.8:1 to 2.2:1 and from 4.7:1 to 5.3:1.

The solidification behaviour or the setting time of the geopolymer foam formulation of the invention can be influenced advantageously by adding cement. A particularly suitable material here is Portland cement, calcium aluminate cement or a mixture thereof. Particular preference is given here to calcium aluminate cement. It is also possible to use composite cements.

Portland cement comprises about 70% by weight of CaO+MgO, about 20% by weight of $SiO_2$ and about 10% by weight of $Al_2O_3+Fe_2O_3$. Calcium aluminate cement comprises about 20 to 40% by weight of CaO, up to about 5% by weight of $SiO_2$, about 40 to 80% by weight of $Al_2O_3$ and up to about 20% by weight of $Fe_2O_3$. These cements are well known in the prior art (cf. DIN EN 197).

It is preferable that the proportion of the cement in the geopolymer foam formulation is at least 1% by weight, preferably at least 2% by weight and in particular at least 3% by weight. The setting time can also be controlled by adding $Ca(OH)_2$. The proportion of $Ca(OH)_2$, based on the geopolymer foam formulation of the invention, can be from 1 to 15% by weight, in particular from 3 to 10% by weight. The proportion of cement in the formulation of the invention should be at most 20% by weight, preferably at most 10% by weight and in particular at most 5% by weight. As mentioned in the introduction, the sum of all of the percentages of the specified and unspecified constituents of the formulation of the invention here must always be 100%.

Many other additives can be present in the geopolymer foam formulation of the invention. The formulation can also comprise at least one additive for foam stabilization, shrinkage reduction, flexibilization, hydrophobization, or dispersion, fibres and fillers or a mixture thereof.

For foam stabilization it is possible to use additives from the group consisting of fumed silica, proteins, rheology-modifying agents, e.g. starches (inter alia xanthan gum, diutan gum), modified starches, poly(meth)acrylates and -(meth)acrylamides bearing sulpho and/or quaternized ammonium groups and mixtures thereof.

Poly(meth)acrylates and -acrylamides bearing sulpho groups and/or bearing quaternized ammonium groups are described by way of example in our Patent Applications WO 2008/151878 A1, WO 2007/017286 A1, WO 2005/090424 A1 and WO 02/10229 A1. (Co)polymers of this type are also termed superabsorbing polymers (SAPs) or salt-insensitive superabsorbing polymers (SISAs). Materials involved here are generally rheology-modifying agents, and thickeners and, respectively, water-retention agents. SISAs are very particularly suitable as thickeners here, specifically because of the high alkalinity, and the attendant high salt loading, of the geopolymer foam formulations under consideration here.

Surprisingly, it has been found that the processability of the foam can be improved by adding superabsorbers. Addition of salt-insensitive superabsorbing polymers can markedly increase stiffness and avoid any tendency towards increasing flowability of the silicate foams.

For shrinkage reduction it is possible to use additives from the group consisting of amines, lactams, alkanolamines, betaine(s), glycols, polyols, hollow aluminosilicate beads, hollow glass beads, foamed glass and mixtures thereof. In this context hollow aluminosilicate beads can be considered not only as an additive for shrinkage reduction but also as a pozzolanic binder. Preference is given to hollow aluminosilicate beads with a grain size of at most 100 µm. The proportion of hollow microbeads in the geopolymer foam formulation of the invention is preferably at most 30% by weight.

For flexibilization it is possible to use additives from the group consisting of redispersible polymer powders, polyisocyanates, polyisocyanate prepolymers, epoxy resins, epoxy compounds, (film-forming) acrylate dispersions and mixtures thereof.

In one preferred embodiment, the geopolymer foam formulation of the invention comprises an epoxy resin. This can improve mechanical properties, in particular in respect of cracking, tensile strength in bending, and the haptic properties of the hardened foam. The hardened geopolymer foams of the invention have inter alia the substantial advantage that they are incombustible and moreover, unlike some other foams, for example melamine resin foams, cannot liberate formaldehyde. The proportion of the epoxy resin in the geopolymer foam formulation can in particular be from 0.5 to 10% by weight. A proportion that has proved particularly advantageous with respect to the required incombustibility of the hardened foam is from 1 to 5% by weight.

In another preferred embodiment, the geopolymer foam formulation of the invention comprises a water-emulsifiable epoxy compound and/or at least one self-emulsifying epoxy resin emulsion. The epoxy resin gives the hardening geopolymer foam not only the advantages described above but also earlier mechanical stability, thus permitting earlier removal of the hardened geopolymer foam from the mould. When epoxy is added it is moreover possible to achieve hardening even at +5° C. The epoxy compounds can comprise a resin and hardener or a combination of resin, hardener and reactive diluent. The epoxy preferably involves a bisphenol NF mixture and the hardener preferably involves a polyamino adduct. Reactive diluents preferably used are polyglycidic ethers of alkoxylated aliphatic alcohols.

In an embodiment to which further preference is given, an epoxy resin is mixed with a reactive diluent in a ratio of from 60:40 to 40:60 parts by weight, and with further preference from 140 to 160 parts by weight of hardener are added to this mixture. Epoxy resin used can in particular be a self-dispersing epoxy resin emulsion, and this is preferably used in a stoichiometric ratio of from 0.9:1 to 1.1:1 with a polyaminoamide adduct. Examples of commercially available self-dispersing epoxy resin emulsions that can be used are Waterpoxy® 1422, Waterpoxy® 1439, Waterpoxy® 1466 and hardener Waterpoxy® 751, Waterpoxy® 760, Waterpoxy® 801. It is preferable to use a mixture of Waterpoxy® 1422 and Waterpoxy® 760. The epoxy emulsions mentioned are products of BASF SE.

For hydrophobization it is possible to use additives from the group consisting of triglycerides, paraffins, polysiloxanes, hydrosilanes, alkoxysilanes, sodium methylsiliconate and mixtures thereof. Polysiloxanes are generally used in the form of silicone oils. A silicone oil with a viscosity of from 300 to 1000 mPa*s can preferably be used. An example of a suitable product available commercially is AK 500 silicone oil from Wacker Chemie AG.

For dispersion it is possible to use additives from the group consisting of naphthalenesulfonate, lignosulfonate, comb polymers such as polycarboxylate ethers, comb-shaped polyaromatic ethers, comb-shaped cationic copolymers and mixtures thereof. Dispersing agents of this type are well known in the prior art. Comb-shaped polyaromatic ethers which have particularly good suitability for increasing flowability of silicate-containing geopolymer systems are described by way of example in our WO 2013/152963 A1. Comb-shaped cationic copolymers which have particularly good suitability for increasing flowability of highly alkaline geopolymer systems are described by way of example in our Patent Application EP 13186438 of 27.09.2013, on which priority is based.

The fibres mentioned in the introduction can be selected from the group consisting of rock fibres (e.g. basalt fibres), glass fibres, carbon fibres, optionally modified organic fibres (PE, PP, PVA, PAN, polyesters, polyamides and the like), cellulose fibres, lignocellulose fibres, metal fibres (e.g. iron, steel and the like) and mixtures thereof. The proportion present of the fibres can preferably be up to 3% by weight. This can improve the mechanical stability of the hardened foam. They preferably have a length of at most 120 mm, in particular of at most 6 mm.

The fillers mentioned in the introduction can be selected from the group consisting of quartz sand or powdered quartz, calcium carbonate, rock flour, natural and synthetic graphites, low-density fillers (for example vermiculite, perlite, diatomaceous earth, mica, talc powder, magnesium oxide, foamed glass, foam sand), pigments (e.g. titanium dioxide), high-density fillers (e.g. barium sulphate), metal salts (e.g. zinc salts, calcium salts, etc.), and mixtures thereof. Grain sizes suitable here are in particular up to 1 mm. It is preferable to use foamed glass. It is particularly preferable that the average grain size of the foamed glass is from 50 to 300 µm. However, it is also possible that retarders, accelerators, complexing agents, and the like are present in the geopolymer foam formulation.

It is possible that, in the geopolymer foam formulation of the invention, either all of the constituents are present together as a single component or that solid constituents are held in a first, solid component and the water is held in a second, liquid component (and are mixed with one another only immediately prior to use, and foamed). Whereas the two-component embodiment is commercially viable, the single-component embodiment is primarily suitable for in-situ production of finished geopolymer foam elements.

The density of the hardened geopolymer foam, dried to residual water content of about 5% by weight, is preferably (i.e. the "dry apparent density") from 120 to 400 kg/m$^3$, particularly preferably from 240 to 350 kg/m$^3$ and in particular at most 300 kg/m$^3$. In one preferred embodiment an open-cell structure is present. The foam has very good suitability for attachment by adhesion, by use of plugs, by nails and/or by screw threads, but in another possibility it is applied in the form of geopolymer foam formulation of the invention by casting, spraying, and/or rolling, and is then allowed to harden and dry.

The present invention further provides a process for the production of the geopolymer foam formulation of the invention, characterized in that the formulation is subjected to foaming via mechanical introduction of gas, in particular of air. For acoustic effectiveness it is particularly preferable that the air content of the foam should be from 50 to 80 percent by volume. This process can be carried out with the aid of a stator-rotor process, or of an oscillating process or by means of mechanical agitation.

In one specific embodiment, the components of the geopolymer foam formulation of the invention are mixed with one another by using, for example, a commercially available mixer of the type used on construction sites. It is preferable here to form a suspension of density from 1000 to 1200 g/litre. This suspension can then be foamed in a mixing head constructed according to the stator-rotor operating principle. Examples of suitable devices here are the Mügromix+ and Sicomix models from Heitec Auerbach GmbH. A device particularly suitable for the oscillating process is marketed as "beba Schaummischer" from beba Mischtechnik GmbH.

It is preferable that the wet apparent density of the foam is from 100 to 800 g/litre, in particular from 150 to 600 g/litre. The process of the invention further provides that the geopolymer foam is preferably dried at temperatures of from 20 to 30° C. and at a relative humidity of least 65%. Removal from the mould can take place after from 24 to 48 hours. (After as little as 12 hours when epoxy is added.)

The present invention further provides the use of the geopolymer foam formulation of the invention for the production of an incombustible, sound-absorbing, thermally insulating geopolymer foam element.

The present invention further provides an incombustible, sound-absorbing, thermally insulating geopolymer foam element which comprises the geopolymer foam formulation of the invention.

It is preferable that this geopolymer foam element of the invention is in sheet form with thickness from 2 cm to 20 cm, preferably from 4 cm to 8 cm, and with edge length from 20 cm to 150 cm, preferably about 60 cm.

An advantage that may be mentioned of the geopolymer foam element of the invention is its advantageous behaviour in the event of fire. Even when organic additives are used, and in particular in the presence of epoxy resins, very good results are achieved. No smoke or drops of flaming material are produced during flame application (DIN EN ISO 11925-2). In particular here, the geopolymer foam of the invention exhibits A2 or A1 fire behaviour in accordance with DIN 13501-1.

Figure 1:
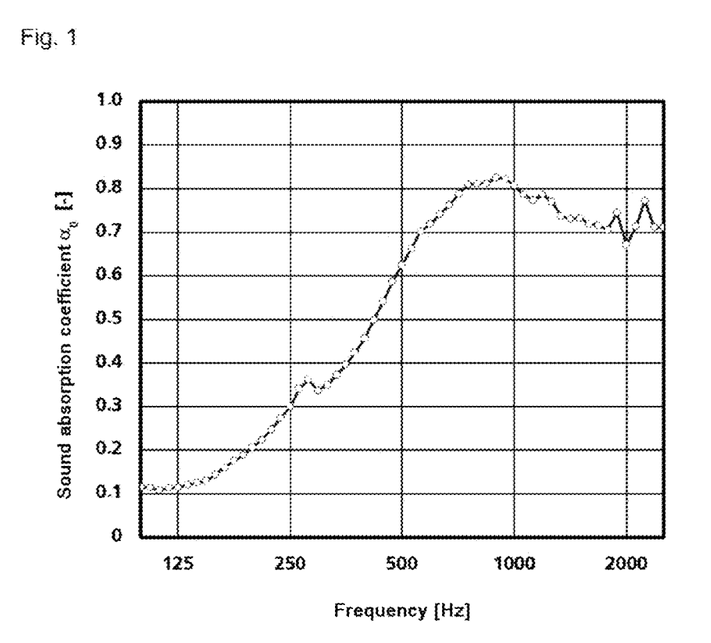
FIG. 1 shows the sound-absorption curve for a geopolymer foam element.

The sound absorption curve for a geopolymer foam element of the invention (according to Example 3 with a dry apparent density of 270 kg/m$^3$ and with a thickness of 40 mm, perpendicular incidence of sound in a Kundt tube) is presented in FIG. 1. The measurements were made by the IBP institute of the Fraunhofer-Gesellschaft in accordance with DIN EN ISO 354 (2003) and, respectively, DIN EN ISO 11654 (1997). Dry apparent densities of from 240 to 350 kg/m$^3$ are particularly suitable for sound absorption.

The compressive strength values for the geopolymer foam element of the invention depend on the composition and are from 0.1 to 1.4 MPa after 7 days of hardening at from 23 to 25° C. and 65% rel. humidity, where the test samples are foil-covered until they are removed from the mould, and where, in accordance with the object stated in the introduction, preference is naturally given to the higher values.

The thermal insulation values for the geopolymer foam element of the invention are in the range from 40 to 80 mW/(m*K).

It is moreover also possible to provide cladding to the geopolymer foam element sheet of the invention, but care must be taken here to ensure that there is no substantial resultant impairment of the sound-absorbing properties of the element. Suitable materials here are non-woven wool fabric, rendering materials, paint and textiles with an open-pore structure permeable to sound. Glass-fibre non-woven reinforcement has particularly good suitability. In particular the textiles can have a coloured or printed pattern.

The non-limiting examples and the attached figure below will now provide further explanation of the present invention.

EXAMPLES

Example 1

Production of a Geopolymer Foam from Metakaolin and Flyash

The components listed in Table 1, except for the surfactant, were mixed by using a manual mixer.

TABLE 1

| | Description, trade name (producer) | Mass [g] | % by wt. |
|---|---|---|---|
| 1M potassium hydroxide solution | Emsure ® (Merck KGaA) | 50.04 | 16.41 |
| Potassium waterglass | K 45 M (Wöllner GmbH + Co. KG) | 87.50 | 28.70 |
| Surfactant | $C_{8-10}$-alkyl polyglucosid (m = 1-5), Glucopon ® DK225 (BASF SE) | 2.20 | 0.72 |
| Metakaolin | Metamax ® (BASF SE) | 71.10 | 23.32 |
| Hollow beads | Fillite ® 106 hollow aluminosilicate beads (Omya GmbH) | 55.60 | 18.23 |
| Flyash | Lühnen power station (STEAG Power Minerals GmbH) | 15.50 | 5.08 |
| Dispersion powder | Polyacrylate dispersion powder, Acronal ® S430 P (BASF SE) | 15.00 | 4.92 |
| Fibres | Polyacrylonitrile, 6.7 dtex/6 mm (Trevira GmbH) | 8.00 | 2.62 |
| Total mass | | 304.94 | 100.00 |

This gave a suspension of density from 1000 to 1200 g/l. Finally, the surfactant was added and the mixture was mixed for a further 30 seconds. The suspension was pumped by way of a hose into a fully automatic foaming machine for continuous foaming of liquids and low-viscosity pastes, operating in accordance with the stator-rotor principle (Mügromix+ from Heitec Auerbach GmbH). The process parameters were as follows: mixing head rotation rate 300 rpm, system air pressure ~2 bar, material throughput 120 litres/hour. The density of the resultant foam was 375 g/litre and its air content was 55 percent by volume. The air content was determined here by way of the volume change in comparison with the unfoamed suspension by a method based on DIN EN 1015-6. The following properties were obtained:

Dry apparent density: 274 kg/m$^3$

Early strength after 14 days: from 0.12 to 0.24 MPa

Final strength after 28 days: 1.2 MPa

Thermal conductivity: from 46 to 48 mW/mK

Example 2

Production of a Geopolymer Foam from Blast Furnace Slag, Microsilica and Metakaolin Example 1 was repeated with the components listed in Table 2:

TABLE 2

| | Description, trade name (producer) | Mass [g] | % by wt. |
|---|---|---|---|
| Mains water | | 16.30 | 5.75 |
| 1M potassium hydroxide solution | Emsure ® (Merck KGaA) | 22.20 | 7.82 |
| Potassium waterglass | K 42 (Wöllner GmbH + Co. KG) | 120.00 | 42.30 |
| Surfactant | Glucopon ® DK225 (BASF SE) | 2.21 | 0.78 |
| Metakaolin | Metamax ® (BASF SE) | 37.00 | 13.04 |
| Microsilica | RW filler Q1 (RW silicium GmbH) | 37.00 | 13.04 |
| Granulated blast furnace slag | Heidelberg granulated blast furnace slag (HeidelbergCement AG) | 37.00 | 13.04 |
| Betaine | (Sigma-Aldrich) | 10.00 | 3.52 |
| Silicone oil | AK 500 silicone oil (Wacker Chemie AG) | 2.00 | 0.71 |
| Total mass | | 283.71 | 100.00 |

The following properties were obtained:
Dry apparent density: 261 kg/m$^3$
Early strength after 7 days: 1.2 MPa
Final strength after 28 days: 3.3 MPa
Thermal conductivity: 50 mW/mK Comparison of Example 1 with Example 2 shows that the formulation made of blast furnace slag, microsilica and metakaolin achieves markedly higher early and final strength values with almost identical thermal conductivity values.

Example 3

Production of a Geopolymer Foam from Metakaolin and Flyash

Example 1 was repeated with the components listed in Table 3:

TABLE 3

| | Description, trade name (producer) | Mass [g] | % by wt. |
|---|---|---|---|
| Mains water | | 52.65 | 18.27 |
| Potassium hydroxide | | 2.95 | 1.02 |
| Potassium waterglass | K 45 M (Wöllner GmbH + Co. KG) | 97.20 | 33.74 |
| Surfactant | Glucopon ® DK225 (BASF SE) | 2.21 | 0.77 |
| Metakaolin | Argical ® M 1200 S (AGS SA, Clerac) | 55.53 | 19.27 |
| Hollow beads | Fillite ® 106 hollow aluminosilicate beads (Omya GmbH) | 55.53 | 19.27 |
| Flyash | Lühnen power station (STEAG Power Minerals GmbH) | 15.50 | 5.38 |
| Dispersion powder | Ethylene-vinyl ester-vinyl acetate terpolymer, Vinnapas ® 7055 E (Wacker Chemie AG) | 1.39 | 0.48 |
| Diethanolamine | | 2.00 | 0.69 |
| Silicone oil | AK 500 silicone oil (Wacker Chemie AG) | 2.00 | 0.69 |
| Fibres | Polyacrylonitrile, 6.7 dtex/6 mm (Trevira GmbH) | 1.20 | 0.42 |
| Total mass | | 288.16 | 100.00 |

The following properties were obtained:
Dry apparent density: 270 kg/m$^3$
Final strength after ≥28 days: 1.4 MPa
Thermal conductivity: from 47 to 48 mW/mK FIG. 1 presents the sound absorption curve for a geopolymer foam element manufactured according to Example 3 with a thickness of 40 mm for perpendicular sound incidence in a Kundt tube.

Example 4

Influence of a Superabsorbing Polymer

Example 1 was repeated with the components listed in Table 4:

TABLE 4

| | Description, trade name (producer) | Mass [g] | % by wt. |
|---|---|---|---|
| 1M potassium hydroxide solution | Emsure ® (Merck KGaA) | 57.14 | 17.40 |
| Potassium waterglass | K 45 M (Wöllner GmbH + Co. KG) | 99.87 | 30.40 |
| Surfactant | $C_{8-10}$-alkyl polyglucosid (m = 1-5), Glucopon ® DK225 (BASF SE) | 1.87 | 0.57 |
| Metakaolin | Metamax ® (BASF SE) | 85.00 | 25.87 |
| Hollow beads | Fillite ® 106 hollow aluminosilicate beads (Omya GmbH) | 62.57 | 19.04 |
| Dispersion powder | Polyacrylate dispersion powder, Acronal ® S430 P (BASF SE) | 1.55 | 0.47 |
| Superabsorber *) | | 2.50 | 0.76 |
| Diethanolamine | | 3.92 | 1.19 |
| Silicone oil | AK 500 silicone oil (Wacker Chemie AG) | 6.19 | 1.88 |
| Fibres | Polyacrylonitrile, 6.7 dtex/6 mm (Trevira GmbH) | 7.96 | 2.42 |
| Total mass | | 328.57 | 100.00 |

*) Anionic copolymer of 28 mol % of AMPS ®-Na and 72 mol % of acrylamide ("Copolymer 1" from WO 2008/151878 A1)

This formulation was repeated with the modifications listed in Table 5.

In each case, foaming was carried out until the foam volume was 900 ml. Spread was determined by a method based on DIN EN 1015-3.

TABLE 5

| | Spread [mm] after | | | |
|---|---|---|---|---|
| | 3 min | 10 min | 25 min | 60 min |
| without superabsorber | 131.5 | 139.3 | 147.1 | 152.0 |
| with 0.76% of superabsorber | 124.5 | 132.5 | 138.8 | 141.3 |
| with 1.21% of superabsorber | 118.2 | 124.6 | 131.1 | 135.1 |

This example shows that, with the aid of the superabsorber, it was possible to stabilize the flow behaviour of the geopolymer foam. As superabsorber concentration increases the mixture becomes stiffer. Initial changes of flow behaviour occurred immediately after application. The differences in spread behaviour became more marked as reaction time increased, since the mixture without superabsorber exhibited increasing flowability. Spread measured after 3 minutes depended on the concentration of the superabsorber and was smaller than that of the reference mixture by 7.0 mm and, respectively, 13.4 mm.

Example 5

Influence of a Water-Retention Agent

Example 4 is repeated with the components listed in Table 6:

TABLE 6

| | Explanation, trade name (producer) | % by wt. |
|---|---|---|
| Mains water | | 18.54 |
| Potassium hydroxide | (Potassium hydroxide is optional here) | 1.04 |
| Potassium waterglass | K 45 M (Wöllner GmbH + Co. KG) | 34.27 |
| Surfactant | Glucopon ® DK 225 (BASF SE) | 0.86 |
| Metakaolin | Metamax ® (BASF SE) | 23.50 |
| Hollow beads | Fillite ® 106 (Omya GmbH) | 21.79 |
| Total quantity | | 100.00 |

Figure 2:
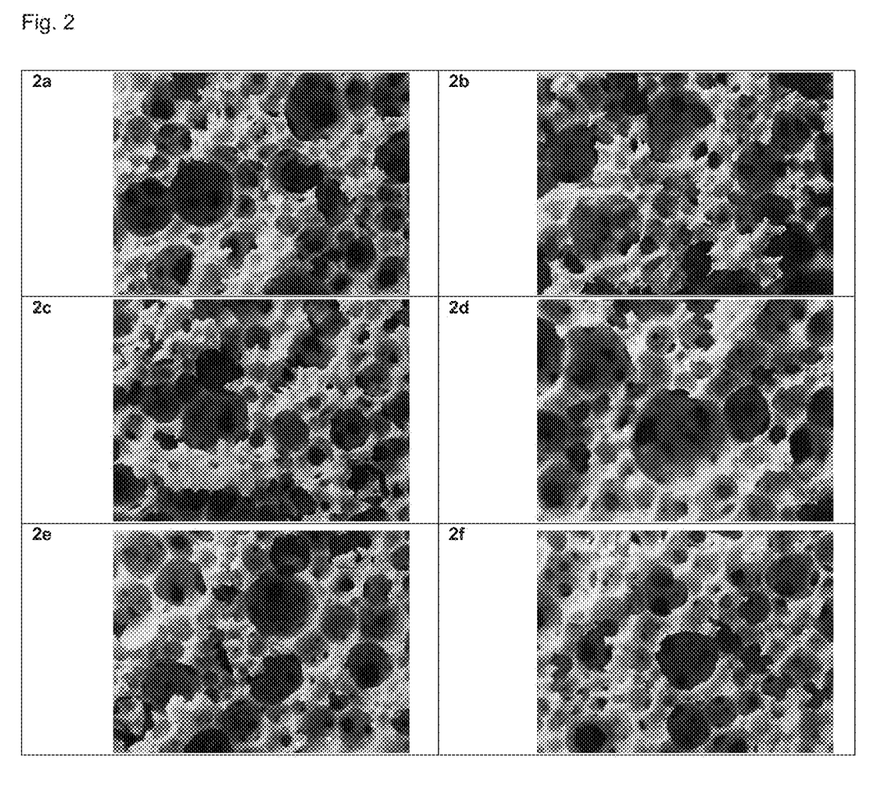
FIG. 2 shows the pore structures of hardened samples.

Addition of a water-retention agent or rheology modifier (Starvis® 308 F, a high-molecular-weight AMPS®-Na/acrylamide copolymer from BASF Construction Solutions GmbH) is intended to bind the water eliminated in the inorganic foam during the processing time and drying time, in order to counteract the liquefaction effect, and thus prevent the flow of the foam from vertical surfaces. To this end, a series of additions was carried out (data in % by weight). The effect of the additive is evaluated on the basis of the spread and the pore structure of the test sample. Spread was determined by a method based on DIN EN 1015-3. These results are shown in Table 7. FIG. 2 (2a-2f) shows the pore structures of the hardened samples.

TABLE 7

| Starvis ® 308 F | Spread [mm] after | | | Flow difference [mm] (4 to 15 min) | Pore structure |
|---|---|---|---|---|---|
| | 4 min | 10 min | 15 min | | |
| 0.00% | 147.33 | 157.78 | 164.88 | 17.55 | 2a |
| 0.05% | 149.28 | 154.25 | 157.73 | 8.45 | 2b |
| 0.10% | 146.28 | 150.40 | 152.00 | 5.72 | 2c |
| 0.20% | 139.90 | 146.98 | 150.73 | 10.83 | 2d |
| 0.50% | 145.43 | 163.73 | 171.83 | 26.40 | 2e |
| 1.00% | 141.18 | 162.85 | 170.75 | 29.57 | 2f |

This example reveals that the flow behaviour of the geopolymer foam could be stabilized with the aid of the water-retention agent Starvis® 308 F. Additions of from 0.05% to 0.20% were most effective. Higher concentrations in turn had an adverse effect. Addition of the water-retention agent had no adverse effect of any kind on the pore structure within the entire range studied (see FIG. 2). Further studies have revealed that there was also no adverse effect on the final strength values.

Example 6

Industrial Foaming Process a) Oscillation Foaming:

A system from beba Mischtechnik GmbH, Essen was used for the oscillation foaming process. The foaming process took place in a mixing head made of interconnected cylindrical chambers which had circular cross section. Each chamber had two replaceable mixing elements preferably equipped with appropriate perforated plates. The mixing head unit, of volume 7.2 l, was supplied from one or more pumps with the respective slurries of the starting materials and, respectively, additives, and also with compressed air, and was operated at an oscillation frequency of from 50 to 70 Hz. EP 1716915 B1 provides a more detailed description of the process and the apparatus. This system was capable of foaming slurries with densities from 1100 to 1700 g/l to give foams with apparent densities from 100 to 500 g/l. Throughput was about 150 l/h.

b) Rotor/stator Foaming:

A rotor/stator apparatus was used to carry out the foaming process. Sicomix or Mügromix+ mixers from Heitec-Auerbach GmbH & Co. KG, Ellefeld have proved to be suitable. The main element of the mixers was a low-shear mixing head operating on the rotor/stator principle. The rotation rate of the mixing head was from 50 to 300 rpm. The densities of the slurries were from 1100 to 1700 g/l, and the apparent densities of the foams were from 100 to 500 g/l. Throughput was about 120 l/h.

Since some additives were insufficiently stable in the highly alkaline range, they were not added until after the actual foaming process. This was achieved by way of a second pump, and also a static mixer, into the output line of the oscillation foaming process and, respectively, rotor/stator foaming process.

We claim:

1. A geopolymer foam formulation comprising:
   at least one inorganic binder comprising metakaolin;
   at least one alkaline activator selected from the group consisting of alkali metal hydroxides, alkali metal carbonates, alkali metal aluminates, alkali metal silicates and mixtures thereof;
   at least one alkyl polyglucoside surfactant;
   a gas phase and
   water.

2. The formulation according to claim 1, wherein the inorganic binder comprises metakaolin and fly ash.

3. The formulation according to claim 1, wherein the inorganic binder comprises metakaolin, blast furnace slag and microsilica.

4. The formulation according to claim 1, wherein the alkaline activator is selected from alkali metal hydroxides of the formula MOH; alkali metal silicates of the formula m $SiO_2 \cdot n\, M_2O$; and a mixture of alkali metal hydroxides and of alkali metal silicates; where M is the alkali metal, Li, Na, or K or a mixture thereof, and the molar ratio m:n is ≤4.0.

5. The formulation according to claim 1, wherein the alkyl polyglucoside has the formula H—$(C_6H_{10}O_5)_m$—O—$R^1$, where $(C_6H_{10}O_5)$ is a glucose unit and $R^1$ is a $C_{8-12}$-alkyl group, and m=from 1 to 5.

6. The formulation according to claim 1, wherein the formulation comprises
   from 20 to 75% by weight of inorganic binder,
   from 1 to 55% by weight of alkaline activator (calculated as solids content),
   from 20 to 60% by weight of water (total quantity),
   and also surfactant, gas phase and optionally other additives.

7. The formulation according to claim 1, wherein the formulation comprises at most 20% by weight of a cement, Portland cement, calcium aluminate cement or a mixture thereof.

8. The formulation according to claim 1, wherein the gas phase is selected from the group consisting of air, nitrogen, noble gas, hydrocarbons and mixtures thereof.

9. The formulation according to claim 1, wherein from 20 to 90 percent by volume of the formulation consists of the gas phase.

10. The formulation according to claim 1, wherein either all of the constituents are present together as a single component or solid constituents are held in a first, solid component and the water is held in a second, liquid component.

11. The formulation according to claim 1, wherein the formulation also comprises at least one additive for foam stabilization, shrinkage reduction, flexibilization, hydrophobization, or dispersion; fibres, fillers, or a mixture thereof.

12. The formulation according to claim 11, wherein the additive for foam stabilization is selected from the group consisting of fumed silica, proteins, rheology-modifying agents, starches, modified starches, poly(meth)acrylates bearing sulpho and/or quaternized ammonium groups, poly(meth)acrylamides bearing sulpho and/or quaternized ammonium groups, and mixtures thereof.

13. The formulation according to claim 11, wherein the additive for shrinkage reduction is selected from the group consisting of amines, alkanolamines, betaine(s), glycols, polyols, hollow aluminosilicate beads, hollow glass beads, foamed glass and mixtures thereof.

14. The formulation according to claim 11, wherein the additive for flexibilization is selected from the group consisting of redispersible polymer powders, polyisocyanates, polyisocyanate prepolymers, epoxy resins, epoxy compounds and mixtures thereof.

15. The formulation according to claim 11, wherein the additive for hydrophobization is selected from the group consisting of triglycerides, paraffins, polysiloxanes, hydrosilanes, alkoxysilanes, sodium methylsiliconate and mixtures thereof.

16. The formulation according to claim 11, wherein the additive for dispersion is selected from the group consisting of comb polymers, polycarboxylate ethers, comb-shaped polyaromatic ethers, comb-shaped cationic copolymers and mixtures thereof.

17. The formulation according to claim 11, wherein the fibres are selected from the group consisting of rock fibres, glass fibres, carbon fibres, optionally modified organic fibres, cellulose fibres, lignocellulose fibres, metal fibres and mixtures thereof.

18. The formulation according to claim 11, wherein the fillers are selected from the group consisting of quartz sand, calcium carbonate, rock flour, low-density fillers, pigments, high-density fillers, metal salts and mixtures thereof.

19. An incombustible, sound-absorbing, thermally insulating geopolymer foam comprising the geopolymer foam formulation according to claim 1.

20. The geopolymer foam element according to claim 19, wherein the geopolymer foam element is in sheet form.

* * * * *